May 19, 1959

SUK KUN CHE 2,886,856

EXPANDABLE TRAILER

Filed April 4, 1956

INVENTOR.
SUK KUN CHE

BY *Albert L. Jeffers*

ATTORNEY

INVENTOR.
SUK KUN CHE
BY Albert L. Jeffers
ATTORNEY

May 19, 1959  SUK KUN CHE  2,886,856
EXPANDABLE TRAILER
Filed April 4, 1956  4 Sheets-Sheet 3
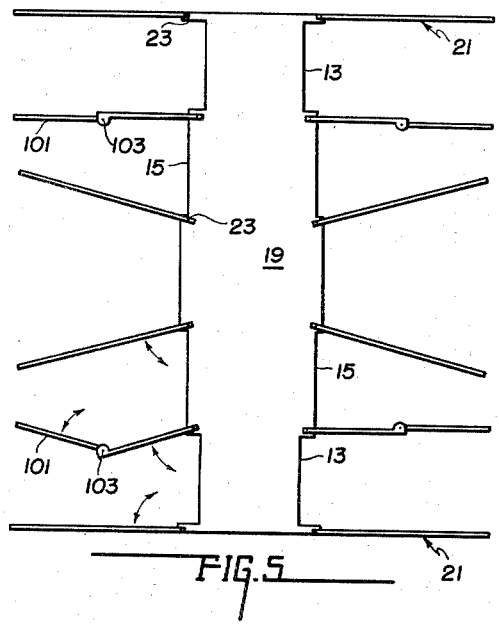
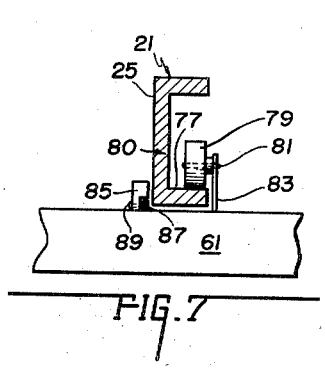
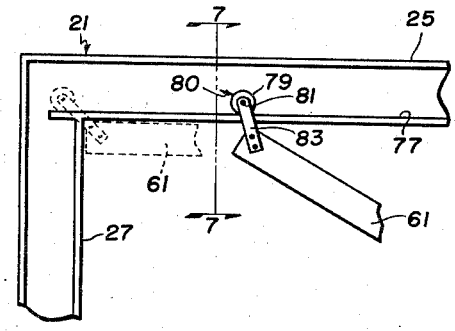
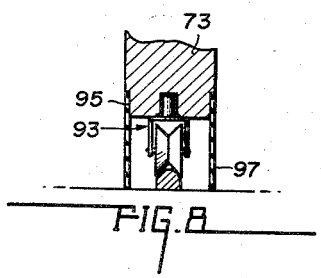
INVENTOR.
SUK KUN CHE
BY *Albert L. Jeffers*
ATTORNEY May 19, 1959     SUK KUN CHE     2,886,856
EXPANDABLE TRAILER Filed April 4, 1956     4 Sheets-Sheet 4

INVENTOR.
SUK KUN CHE
BY
Albert L. Jeffers
ATTORNEY

United States Patent Office 2,886,856
Patented May 19, 1959

2,886,856

EXPANDABLE TRAILER

Suk Kun Che, Fort Wayne, Ind.

Application April 4, 1956, Serial No. 576,215

7 Claims. (Cl. 20—2)

This invention relates generally to a trailer, and it relates more particularly to an expandable trailer whereby a greater living or service area may be obtained by unfolding collapsible sections.

A principal object of the present invention is to provide a trailer having a central permanent body of a shape and size which will be convenient for towing behind an automobile and wherein the central body portion embodies a novel extensible structure which, when the trailer is stationary, may be extended to substantially increase the floor space or area of the trailer.

An important object of the invention is the provision of a trailer having means for increasing the floor area which is well adapted for military purposes, such as living quarters, offices, or movable hospitals.

A still further object of the invention is to provide an expansible trailer having unique rotating U-shaped frame members for supporting the expansible sections.

Yet another object of the invention is the provision of an expansible trailer which may be easily folded or collapsed to provide a lightweight, compact and neat appearing structure which may be transported from place to place by means of a conventional automobile.

An important feature of this invention is the provision of a trailer which has extensible sections on the sides thereof which will substantially provide more than four times as large a service area as the central body section of the trailer when the extensible sections are in the expanded position.

Another object of the invention is the provision of novel means for supporting the expansible sections, including guide means for the proper positioning of the sections whereby a single person can conveniently fold or unfold the sections as may be desired.

With these objects definitely in view, together with other objects which will appear as this description proceeds, this invention resides in certain novel features of construction, combination and arrangement of parts as will be hereinafter described in detail in the specifications, particularly pointed out in the appended claims and illustrated in the accompanying drawings which form a material part of this application and in which:

Figure 5 is a top plan view of the trailer illustrated in Figures 9 and 10 with parts removed illustrating the rotating U-shaped frame members.

Figure 6 is a fragmentary view of one of the frame members in Figure 5 illustrating the sliding means.

Figure 7 is a sectional view taken on the line 7—7 of Figure 6 showing the roller assembly supported on the frame member.

Figure 8 is a fragmentary view illustrating the track and roller assembly for the floor and outer wall sections.

Figure 1:
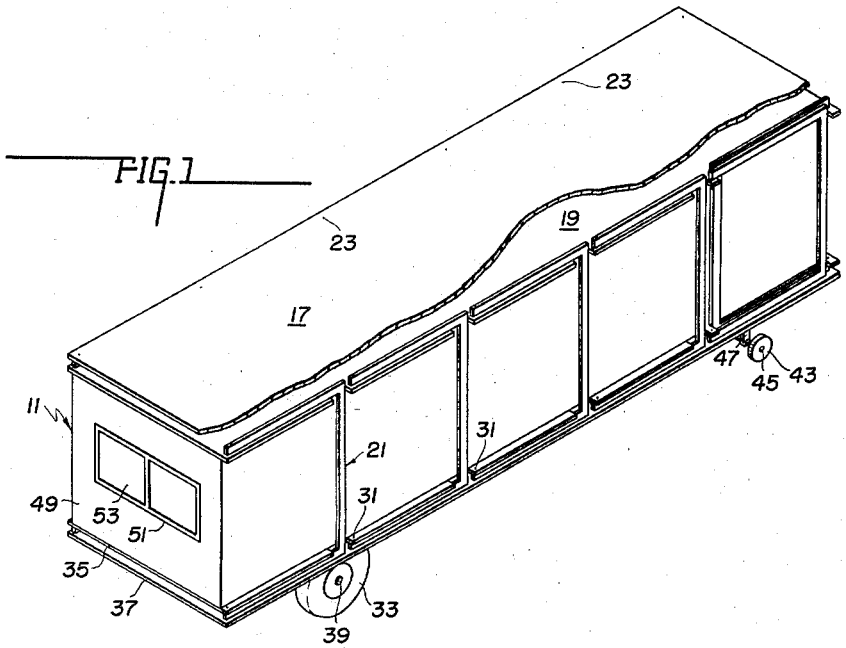
Figure 1 is a perspective view of a trailer with single expansible sections on each side with parts broken away shown in the folded position.

This is a continuation in part of my application Serial No. 479,755 filed January 4, 1955, now abandoned.

Referring now more particularly to Figures 1, 2, 3 and 4, the numeral 11 designates the central permanent body portion or section of the trailer which may be constructed of conventional shape and design and provided with a number of recesses or compartments 13 and 15 for receiving the extensible sections when in folded position.

The roof 17 is spaced from the ceiling 19 forming an air or insulating space 20 by one end of the rotating U-shaped frame members 21 which are pivoted about pins 23. The rotating frame members are comprised of beam 25, studs 27 and sills 29. The other end of the frame members are also pivotally connected by pins 31 which are disposed between the floor 35 and subfloor 37 forming an air or insulating space 22.

Slightly rearwardly of the longitudinal central portion of the main body section are mounted a pair of wheels 33 which are journalled on a suitable axle 39 which is in turn connected to the main frame 41 in a conventional manner. Slightly forward of the longitudinal central portion of this main body section are mounted a pair of dolly wheels 43 which are journalled on a suitable axle 45 supported by a conventional retractable frame member 47.

The end wall 49 is provided with conventional window frames 51 having window panes 53.

When the building is in the expanded position, jacks 55 may be placed under the building structure, preferably under each rotating frame member. The jacks may be of any suitable construction, preferably of the telescoping type, in order that the jacks will be properly positioned to level the structure. The extensible floor section 57 is pivotally connected along its inner longitudinal edge to the main body portion at 59. The extensible roof section 61 is pivotally connected along its inner longitudinal edge to the main body portion at 63. The extensible outer side wall section 65 has the end walls 67 and 69 pivotally connected (not shown) along its vertical edge to the main body portion and are hinged at 71 to the outer side wall 73. The end walls are hinged or pivotally connected at 75 for a purpose to be later described. The outer wall is provided with a door 76, for access to the interior of the trailer.

As shown in Figures 6 and 7, the beam 25 of the U-shaped frame member is constructed from a channel member and is positioned inwardly to form a track 77 for receiving a roller 79 mounted on a pin 81 which is supported by the member 83. A removable stop 85 connected to the member 87 by a screw or pin 89 is provided for maintaining the roller assembly 80 on the track. As shown in Figure 6, the roller assembly is mounted on the outer marginal edge of the roof section at approximately 45 degrees which will permit the roof 61 to lie flat against the rotating beams when in the extended position as shown by the broken lines.

A track 91 is mounted on the face or upper portion of the sill 29 to receive a conventional roller assembly 93 pivotally connected on the bottom end of the outer wall section 73.

The wall section is provided with recesses 95 adjacent the edge to receive a flexible member 97 which serves to hide and conceal the roller assembly.

Figure 2:
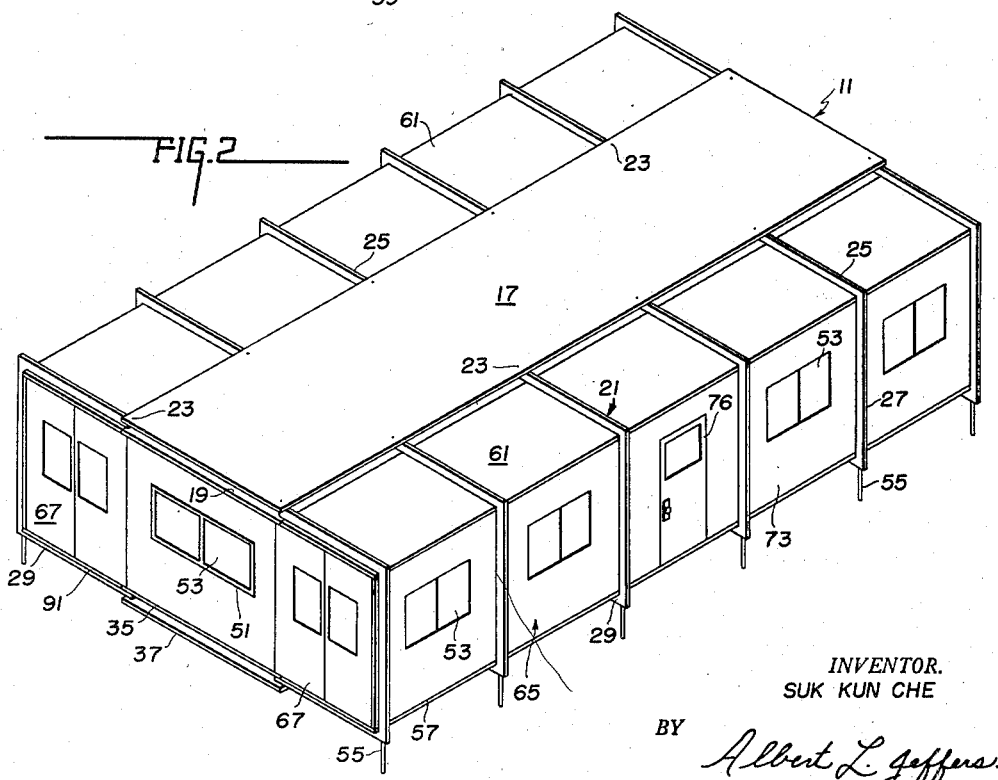
Figure 2 is a perspective view of the trailer illustrated in Figure 1 with the sections in the unfolded position with respect to the main body portion.

To place the trailer in operation or service, the rotating beams 25 are positioned approximately 90 degrees with respect to the main central section and the telescope jacks 55 are adjusted to level the trailer. The floor 57 is unfolded with the rollers 93 following the track 91. In the event the rotating beams 21 are not properly positioned, the jacks 55 are adjusted accordingly. The extensible roof is unfolded by the aid of the roller assembly 80 and is secured in the unfolded position by a conventional latch (not shown). The outer wall assembly 65 is unfolded to a position substantially as seen in Figure 2 of the drawings. The walls may be secured or locked in the expanded position by a conventional latch or lock (not shown).

If desired, the extended sections may be provided with a number of partitions 58 which are hinged (not shown) at their inner margins to the main body section and are hinged at their outer marginal edges at 60 to the outer wall 65. In order to collapse the partitions, they are hinged at 62 so that they may be folded in a parallel relationship alongside the permanent body portion of the trailer.

In order to collapse the expansible sections of the trailer when it is desired to be transported, the above steps are merely reversed. The end walls 67 are hinged at 75 so that they may be conveniently folded against the main body portion.

When the expansible sections of the building are in the collapsed or folded condition, the floor section 57 constitutes the exterior side wall of the trailer and the roof and outer wall sections lie in substantially parallel relationship with respect to the main body portion. Also disposed in substantially parallel relationship, when the parts are in folded condition, are the frame members 21.

A modified form of the trailer is illustrated in Figures 3, 5, 9 and 10 wherein the extensible sections may be doubled in size to provide a floor area of approximately four times the central area.

Figure 3:
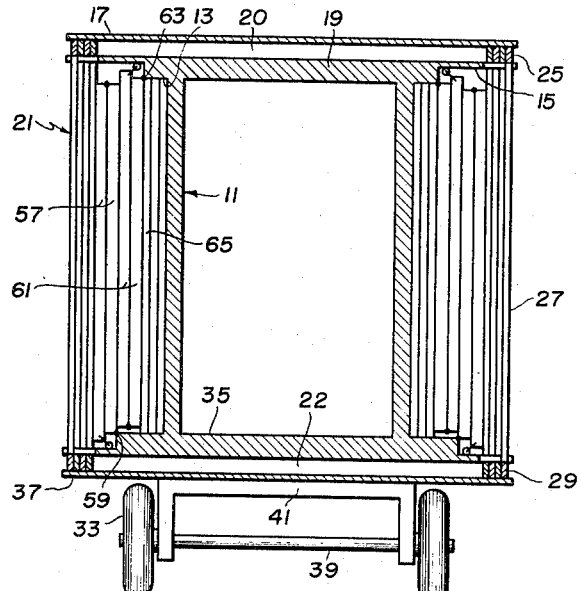
Figure 3 is a vertical section view of the trailer illustrated in Figure 9 with the sections in the folded position.
Figure 4:
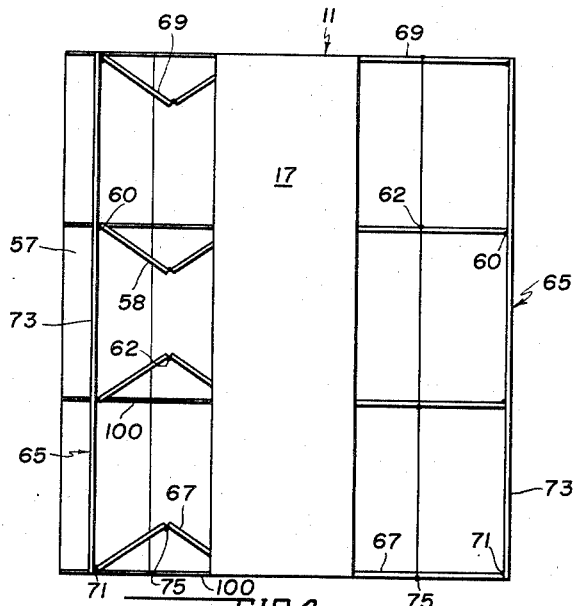
Figure 4 is a top plan view of the trailer with the roof removed illustrating the collapsible partitions.
Figure 9:
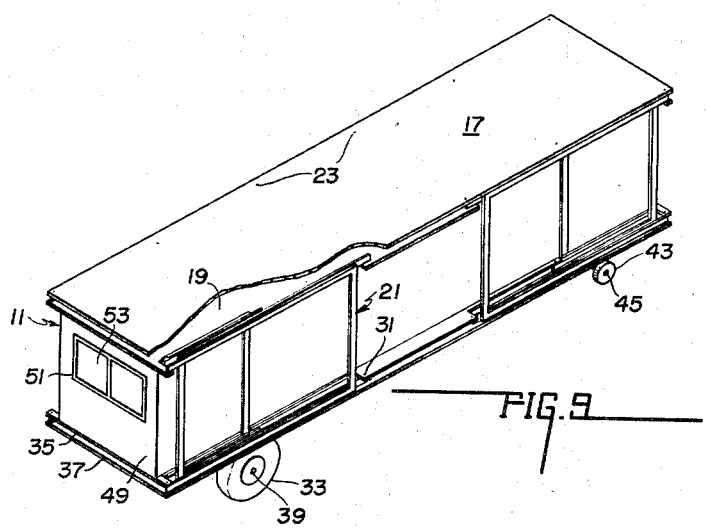
Figure 9 is a perspective view similar to Figure 1 illustrating a trailer having double expansible sections on each side with parts broken away shown in the folded position.
Figure 10:
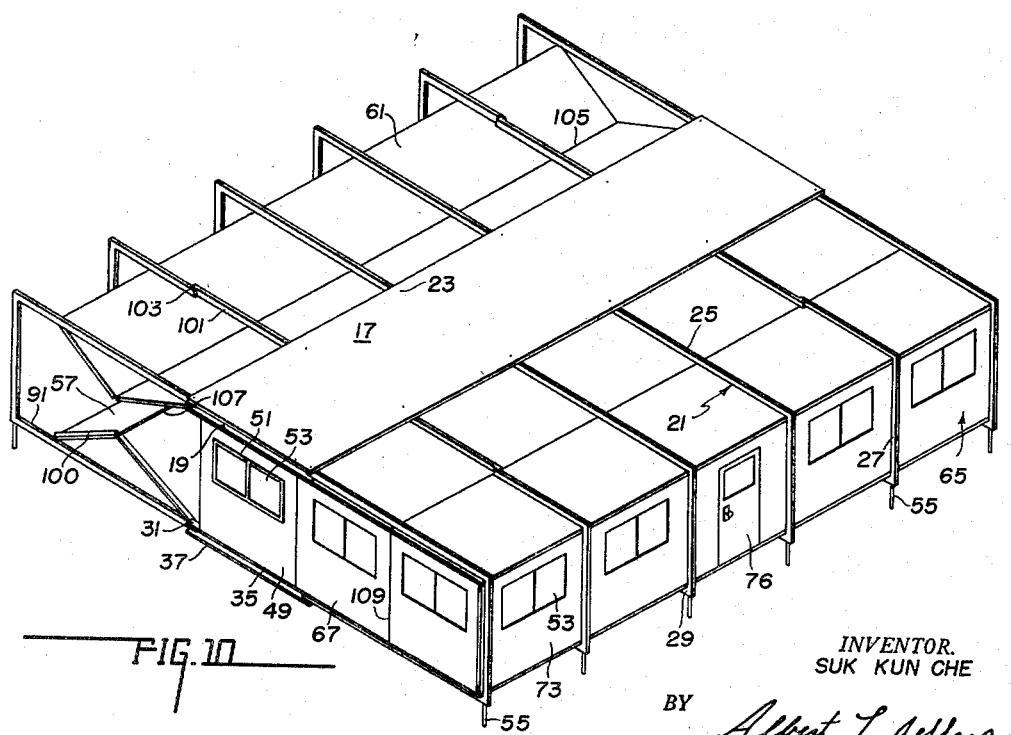
Figure 10 is a perspective view of the trailer illustrated in Figure 9 in its unfolded position with parts omitted to illustrate the folding of the roof and floor sections.

The primary difference in the modified structure is the provision of collapsible U-shaped frame members 101 being hinged at 103 so that they may be folded into the recesses 13. The roof and floor are hinged at 105 and 107 respectively so that they may be conveniently folded against the side of the trailer as illustrated in Figure 3. The outer end walls 67 are hinged at 109 so they may be folded against the side wall of the trailer as illustrated in Figure 4. The floor is provided with a track 100 similar to the track 91 for receiving a roller assembly similar to the roller assembly 93 which is mounted on the lower outer edge of the end walls. The remaining structure and operation of the trailer is identical or similar to the trailer illustrated in Figure 2.

Obviously many modifications and variations of the invention, as hereinbefore set forth, may be made without departing from the spirit and scope thereof, but only such limitations should be imposed as are indicated in the appended claims.

I claim:

1. A trailer comprising, in combination, a central body section, an extensible side section including a number of rotating frame members comprising a beam, stud and sill pivotally connected to said body section, an expansible floor section connected along one of its longitudinal edges to said body section, a first track mounted on the upper face of the sill, a first roller assembly for said first track mounted at each end of the other longitudinal edge of said floor section, an expansible roof section connected along one of its longitudinal edges to said body section, said beam having a portion serving as a second track, a second roller assembly for said second track mounted at each end of the other longitudinal edge of said roof section, an extensible wall including end sections and a side section, said end sections being pivotally connected at one end to said body section and with the side section at the other end, a third track mounted adjacent each end of the floor section and a third roller assembly for said third track mounted at each end of said side section.

2. The combination of claim 1 wherein said frame members are U-shaped and are foldable into parallel relationship with respect to the central body section.

3. The combination of claim 2 wherein each of said sections are foldable into substantially parallel relationship with respect to the central body section.

4. The combination of claim 3 wherein the central body section forms a permanent central living area, and said members and sections are adapted to provide an additional living area to said central area.

5. The combination of claim 4 wherein the central body section is provided with compartments for receiving the sections and members when they are folded.

6. A trailer comprising, in combination, a permanently constructed central section, a foldable floor section, a foldable roof section, a foldable outer wall section, a number of foldable U-shaped frame members, horizontal extending trackways mounted on said members, and rolling means mounted on said sections for engagement with said trackways for folding movements of said sections.

7. The combination of claim 6 wherein said frame members are adapted to support said sections to provide additional area to said permanently constructed central section.

References Cited in the file of this patent

UNITED STATES PATENTS

| | | |
|---|---|---|
| 1,896,748 | Kirkpatrick | Sept. 7, 1933 |
| 2,247,893 | Sieber | July 1, 1941 |
| 2,225,194 | Stout et al. | Sept. 9, 1941 |
| 2,368,936 | McGehee | Feb. 6, 1945 |
| 2,395,691 | Smith | Feb. 26, 1946 |
| 2,606,057 | Johnson | Aug. 5, 1952 |
| 2,624,649 | Greiling | Jan. 6, 1953 |
| 2,689,003 | Helbert | Sept. 14, 1954 |

FOREIGN PATENTS

| | | |
|---|---|---|
| 699,753 | Great Britain | Nov. 18, 1953 |